United States Patent
Ha

(10) Patent No.: US 7,057,675 B2
(45) Date of Patent: Jun. 6, 2006

(54) LIQUID CRYSTAL DISPLAY DEVICE AND THE FABRICATING METHOD THEREOF COMPRISING PIXEL ELECTRODE COMPLETELY COVERING ADJACENT GATE LINE AND ADJACENT CHANNEL REGION UNCONNECTED TO THE PIXEL ELECTRODE

(75) Inventor: Yong-Min Ha, Kyoungsangbuk-do (KR)

(73) Assignee: LG.Phillips LCD Co., Ltd., Seoul (KR)

( * ) Notice: Subject to any disclaimer, the term of this patent is extended or adjusted under 35 U.S.C. 154(b) by 0 days.

(21) Appl. No.: 09/961,701

(22) Filed: Sep. 25, 2001

(65) Prior Publication Data

US 2002/0036724 A1 Mar. 28, 2002

(30) Foreign Application Priority Data

Sep. 25, 2000 (KR) ................................ 2000-56225

(51) Int. Cl.
*G02F 1/1343* (2006.01)

(52) U.S. Cl. ............................. 349/38; 349/39; 349/43; 349/113; 349/187

(58) Field of Classification Search .................. 349/39, 349/38, 43, 140, 45, 41, 113, 114
See application file for complete search history.

(56) References Cited

U.S. PATENT DOCUMENTS

| | | | | |
|---|---|---|---|---|
| 5,822,027 A | * | 10/1998 | Shimada et al. | 349/39 |
| 6,177,916 B1 | * | 1/2001 | Aoki et al. | 345/87 |
| 6,243,153 B1 | * | 6/2001 | Adachi | 349/113 |
| 6,300,987 B1 | * | 10/2001 | Jung | 349/39 |
| 6,317,173 B1 | * | 11/2001 | Jung et al. | 349/42 |
| 6,493,046 B1 | * | 12/2002 | Ueda | 349/38 |

FOREIGN PATENT DOCUMENTS

| | | |
|---|---|---|
| JP | 64-028622 | 1/1989 |
| KR | 1998-83097 | 5/1998 |

OTHER PUBLICATIONS

A 202 ppi TFT-LCD Using Low Temperature poly-Si Technology, Y. Hanazawa, et al., pp. 369-372.

* cited by examiner

*Primary Examiner*—Andrew Schechter
*Assistant Examiner*—Thoi V. Duong
(74) *Attorney, Agent, or Firm*—Morgan, Lewis & Bockius, LLP

(57) ABSTRACT

An array substrate of a liquid crystal display device includes a substrate, a plurality of gate lines disposed on the substrate, a plurality of data lines disposed perpendicular to the gate lines, a plurality of storage capacitors each having at least a first electrode disposed parallel to a corresponding gate line, a plurality of switching devices each electrically connected with the corresponding gate line and a corresponding data line, and a plurality of pixel electrodes each overlapping a portion of an $n^{th}$ storage capacitor and a portion of a $(n-1)^{th}$ storage capacitor.

19 Claims, 9 Drawing Sheets

LIQUID CRYSTAL DISPLAY DEVICE AND THE FABRICATING METHOD THEREOF COMPRISING PIXEL ELECTRODE COMPLETELY COVERING ADJACENT GATE LINE AND ADJACENT CHANNEL REGION UNCONNECTED TO THE PIXEL ELECTRODE

This application claims the benefit of Korean patent application No. 2000-56225, filed Sep. 25, 2000 in Korea, which is hereby incorporated by reference.

BACKGROUND OF THE INVENTION

1. Field of the Invention

The present invention relates to a liquid crystal display (LCD) device, and more particularly to a liquid crystal display device having thin film transistors (TFTs).

2. Discussion of the Related Art

Currently, LCD devices of light weight, thin design, and low power consumption are used in office automation equipment and video units, for example. These LCD devices typically use optical anisotropy of a liquid crystal, wherein thin, long liquid crystal molecules are manipulated for orientation alignment. The alignment direction of the liquid crystal molecules is controlled by application of an electric field to the liquid crystal molecules. When the alignment direction of the liquid crystal molecules are properly adjusted, the liquid crystal is aligned and light is refracted along the alignment direction of the liquid crystal molecules to display image data.

Presently, an active matrix (AM) LCD having a plurality of thin film transistors (TFTs) and pixel electrodes are arranged in shape of an array matrix is proposed because of its high resolution and superiority in displaying moving images. Each of the plurality of TFTs serve to switch a corresponding pixel to transmit incident light. Since amorphous silicon is relatively easy formed on large, inexpensive glass substrates, amorphous silicon thin film transistors (a-Si:H TFTs) are widely used. Alternatively, polysilicon (poly-Si) TFTs having polysilicon active layers have recently been developed to function as switching devices for the LCD devices. Since electron mobility of polysilicon is 100 to 200 times higher than the electron mobility of amorphous silicon, polysilicon TFTs exhibit superior response times. Polysilicon TFTs further exhibit superior stability against temperature and light, and circuits for driving the polysilicon TFTs can be formed on the same substrate where the polysilicon TFTs are formed.

FIGS. 1 and 2 show a conventional array substrate 1 having a polysilicon TFT.

In FIG. 2, a buffer layer 20 made of silicon oxide, for example, is formed on a substrate 10. A TFT active layer 31, a source region 32, a drain region 33, and a storage portion 35 including side portions 35b and 35c, and a capacitor active layer 35a formed of polysilicon, are formed on the buffer layer 20. The source region 32, the drain region 33, and the side portions 35b and 35c of the storage portion 35 are doped with impurities. A gate insulating layer 40 is formed to cover the TFT active layer 31 and the capacitor active layer 35a, and a gate electrode 52 and a capacitor electrode 55 are formed respectively over the TFT active layer 31 and the capacitor active layer 35a. The gate electrode 52 is integrally connected with a gate line 51a. The storage portion 35 and the capacitor electrode 55 comprise a storage capacitor "C." An interlayer-insulating layer 60 formed of silicon oxide or silicon nitride is formed to cover the gate electrode 52 and the capacitor electrode 55. The interlayer-insulating layer 60 includes a first contact hole 61 and a second contact hole 62 that expose the source region 32 and the drain region 33, respectively.

A data line 71, a source electrode 72, and a drain electrode 73 are formed of a conductive material such as metal, for example, on the interlayer insulating layer 60. The data line 71 perpendicularly crosses gate lines 51a and 51b, thereby defining a pixel region "P." The source electrode 72 integrally protrudes from the data line 71, and the drain electrode 73 is disposed opposite to the source electrode 71 with the gate electrode 52 centered therebetween. The source and drain electrode 72 and 73 are respectively connected with the source and drain region 32 and 33 via the first and second contact holes 61 and 62.

A passivation layer 80 covers an overall surface of the substrate 10 where the above-described layers are formed. A third contact hole 81 is formed through the passivation layer 80, thereby exposing the drain electrode 73. A pixel electrode 91 is formed on the passivation layer 80 and electrically contacts the drain electrode 73 via the third contact hole 81. In the above-described structure, the capacitor electrode 55 and the storage portion 35 of the storage capacitor "C" are independently formed in the pixel region "P," and a bias voltage is applied to the capacitor active layer 35a such that the capacitor active layer 35a is always turned on.

FIGS. 3A to 3D, show a fabrication method for the conventional array substrate 1 shown in FIG. 2.

In FIG. 3A, the buffer layer 20 formed of silicon oxide is disposed on the substrate 10. Then, a polysilicon layer 30 is formed on the buffer layer and subsequently patterned. A laser annealing method, a metal induced crystallization (MIC) method, a solid phase crystallization (SPC) method, or a direct deposition method may be applied to form the polysilicon layer 30. In the laser annealing method, the substrate is heated to a temperature of about 250° C. (degrees. C.), and an excimer laser beam is applied to an amorphous silicon layer formed on the substrate. In the MIC method, metal is deposited on an amorphous silicon layer, to function as a crystallization seed. In the SPC method, an amorphous silicon layer is heat-treated at a high temperature for a long time. Generally, in both the MIC and SPC methods, an amorphous silicon layer is deposited and recrystallized to form the polysilicon layer 30. When the amorphous silicon layer is recrystallized to form the polysilicon layer, heat is produced, thereby activating alkali ions, such as K+ and Na+, of the substrate 10. At this point, the buffer layer 20 separates the polysilicon layer 30 from the substrate 10, thereby providing protection from the activated alkali ions of the substrate 10.

In FIG. 3B, an insulating layer made of silicon oxide or silicon nitride and a metal layer are sequentially deposited and patterned to form the gate electrode 52, the capacitor electrode 55, and the gate insulating layer 40 on the polysilicon layer 30. Then, the polysilicon layer 30 is subjected to ion doping such that portions of the polysilicon layer 30, except for portions under the gate electrode 52 and the capacitor electrode 55, are doped. Due to the ion-doping, contact resistance increases between the polysilicon layer 30 and a metal layer forming the source and drain electrodes 72 and 73, which will be formed in a later process.

After the polysilicon layer 30 is doped, it is divided into extrinsic regions 32, 33, 35b, and 35c and intrinsic pure regions 31 and 35a. The extrinsic regions 32 and 33 respectively serve as the source region and the drain region, and the intrinsic region 31 serves as the TFT active layer. For the ion doping, a source gas may include atoms selected from Group III or Group V materials. If a source gas containing atoms of Group V materials is used to form the doped source and drain regions 32 and 33, the source and drain regions 32 and 33 become n-type silicon. If a source gas containing atoms of Group III materials are used, the source and drain regions 32 and 33 become p-type silicon.

In FIG. 3C, silicon oxide or silicon nitride is deposited to cover the surface of the substrate 10 and is subsequently patterned to form the interlayer insulating layer 60 to include the first and second contact holes 61 and 62. The first and second contact holes 61 and 62 expose the source region 32 and the drain region 33, respectively. At this point, the gate electrode 52 and the capacitor electrode 55 are completely covered by the interlayer insulating layer 60, thereby providing electrical insulation from the source and drain electrode 72 and 73, which will be formed in a later process.

In FIG. 3D, metal is deposited and subsequently patterned to form the data line 71, the source electrode 72, and the drain electrode 73. The data line 71 orthogonally crosses the gate lines 51a and 51b (in FIG. 1), and the source and drain electrodes 72 and 73 contact the source and drain regions 32 and 33 via the first and second contact holes 61 and 62, respectively.

Returning to FIG. 2, the passivation layer 80 is formed to cover the surface of the substrate 10 where the source and drain electrodes 72 and 73 are formed. At this point, the passivation layer 80 is patterned such that the third contact hole 81 is formed therethrough to expose a contact portion of the drain electrode 73. Then, a transparent conductive material is deposited on the passivation layer 80 and subsequently patterned, thereby forming the pixel electrode 91. The pixel electrode 91 is disposed in the pixel region "P" defined by the gate lines 51a and 51b and the data line 71, and is electrically connected with the contact portion of the drain electrode 73 via the third contact hole 81.

In the above-described array substrate shown in FIG. 1, although the pixel electrode 91 overlaps the gate line 51b and the data line 71 to increase an aperture ratio, an interval is conventionally interposed between the pixel electrode 91 and the gate line 51a, which are disposed in the same pixel region "P." The interval between the pixel electrode 91 and the gate line 51 a minimizes any capacitive coupling. Accordingly, if the pixel electrode 91 is spaced apart from the gate line 51a by an interval of 2 to 3 µm (micrometer), any induced parasitic capacitance is decreased, thereby creating a uniform displaying quality and decreasing any associated cross-talk.

However, the interval causes misalignment of some liquid crystal molecules (not shown) that are disposed near the interval. The misalignment of the liquid crystal molecules results in a deterioration of the display quality. Therefore, a black matrix (not shown) is usually used to shield the interval and for preventing light from passing through the interval. However, the black matrix deteriorates the aperture ratio and increases power consumption of the LCD device.

SUMMARY OF THE INVENTION

Accordingly, the present invention is directed to an array substrate and a fabrication method thereof that substantially obviate one or more of problems due to limitations and disadvantages of the related art.

An object of the present invention is to provide an array substrate of a LCD device having high aperture ratio, low parasitic capacitance, and high storage capacitance.

Another object of the present invention is to provide a LCD device with improved display quality.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate of a liquid crystal display device includes a substrate, a plurality of gate lines disposed on the substrate, a plurality of data lines disposed perpendicular to the gate lines, a plurality of storage capacitors each having at least a first electrode disposed parallel to a corresponding gate line, a plurality of switching devices each electrically connected with the corresponding gate line and a corresponding data line, and a plurality of pixel electrodes each overlapping a portion of an $n^{th}$ storage capacitor and a portion of a $(n-1)^{th}$ storage capacitor.

In another aspect, a method of fabricating an array substrate for a liquid crystal display device includes steps of forming a first insulating layer on a substrate, forming a polysilicon layer on the first insulating layer, sequentially forming a second insulating layer and a first metal layer on the polysilicon layer, the first metal layer including a gate line, a gate electrode, and a capacitor electrode, doping portions of the polysilicon layer, forming a third insulating layer to cover the first metal layer and the doped portions of the polysilicon layer, the third insulating layer including contact holes exposing the doped portions of the polysilicon layer, forming a second metal layer on the third insulating layer, the second metal layer including at least a data line and a connecting electrode each electrically contacting the doped portions of the polysilicon layer via the contact holes, forming a fourth insulating layer to cover the second metal layer, wherein a portion of the connecting electrode is through the fourth insulating layer, and forming a pixel electrode on the fourth insulating layer, the pixel electrode electrically contacting the connecting electrode, an end portion of the pixel electrode overlapping a portion of the capacitor electrode.

In another aspect, a fabrication method for a liquid crystal display device includes steps of forming a first metal layer on a substrate, the first metal layer including at least a gate line, a gate electrode, and a first capacitor electrode, forming a gate insulating layer to cover the first metal layer, forming a silicon layer on the gate insulating layer, forming an ohmic contact layer on the silicon layer, forming a second metal layer on the ohmic contact layer, the second metal layer including at least a source electrode, a drain electrode, and a second capacitor electrode, forming a passivation layer to cover the second metal layer, the passivation layer including at least a contact hole exposing a portion of the second capacitor electrode; and forming a pixel electrode on the passivation layer, the pixel electrode electrically connected to the second capacitor electrode via the contact hole, wherein an end of the pixel electrode overlaps a portion of the first capacitor electrode.

In another aspect, an array substrate of a liquid crystal display device includes a substrate, a plurality of gate lines disposed on the substrate, a plurality of data lines disposed perpendicular to the gate lines, a plurality of storage capacitors each having at least a first electrode disposed parallel to a corresponding gate line and a second electrode disposed parallel to a corresponding data line, a plurality of switching devices each electrically connected with the corresponding gate line and a corresponding data line, and a plurality of pixel electrodes each electrically connected with a second electrode of one of the plurality of storage capacitors, wherein the second electrode includes first and second portions each disposed opposing the first electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiment of the present invention, which is illustrated in the accompanying drawings.

Figure 1:
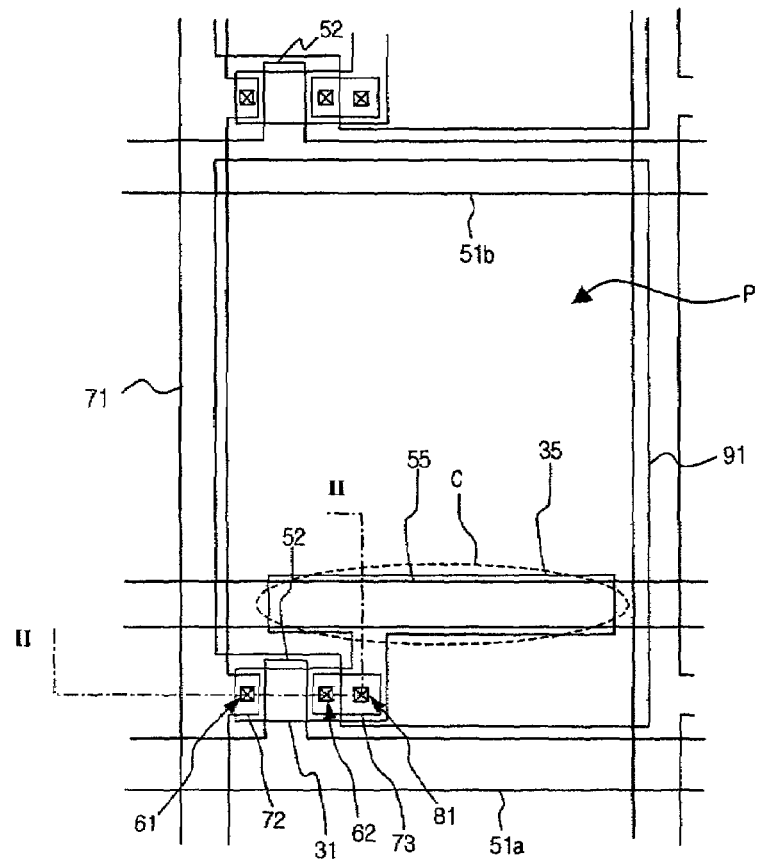
FIG. 1 is a plan view showing an array substrate of a LCD device according to the related art.
Figure 2:
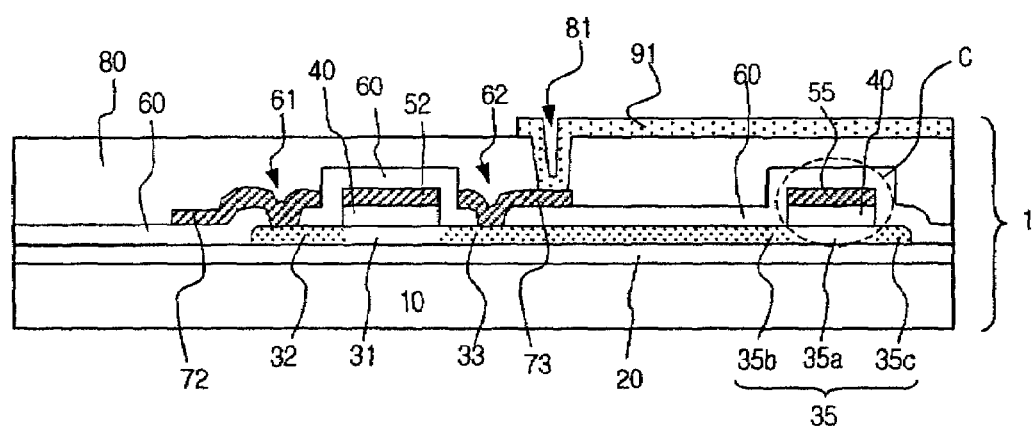
FIG. 2 is a cross-sectional view taken along line II—II of FIG. 1.
Figure 3A:
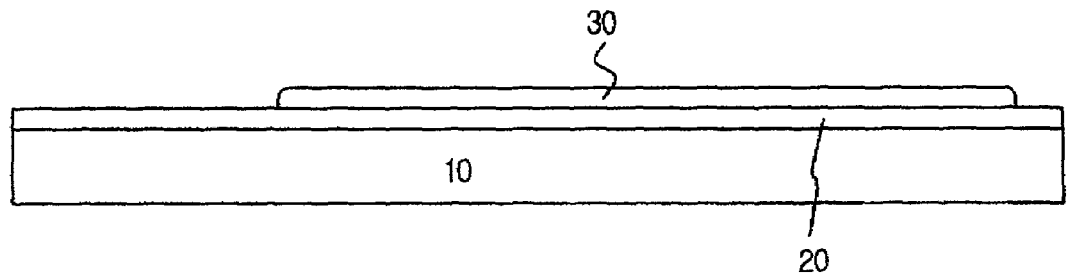
FIG. 3A to 3D are cross-sectional views showing a sequence of fabricating the array substrate of FIG. 1.
Figure 3B:
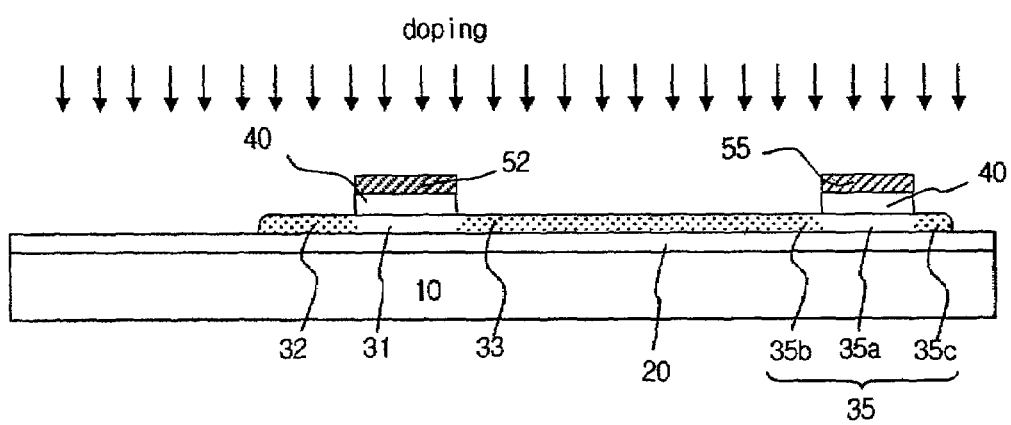
Figure 3C:
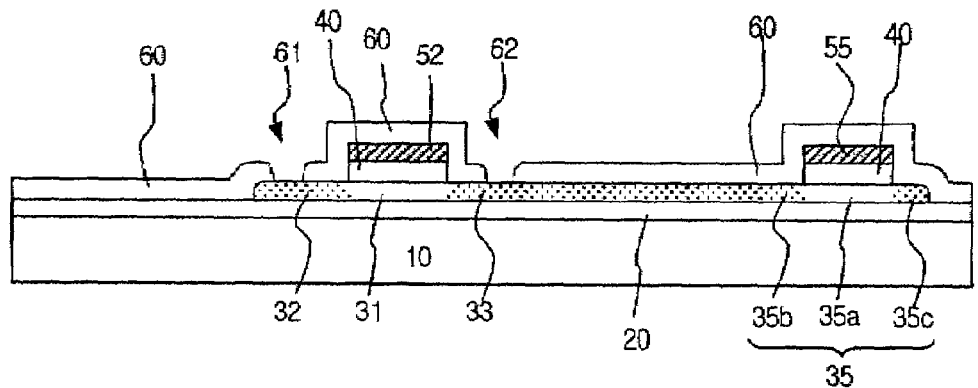
Figure 3D:
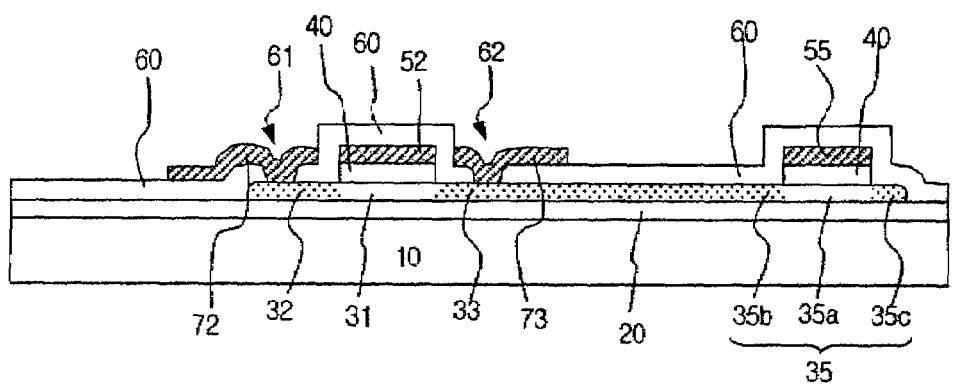
Figure 4:
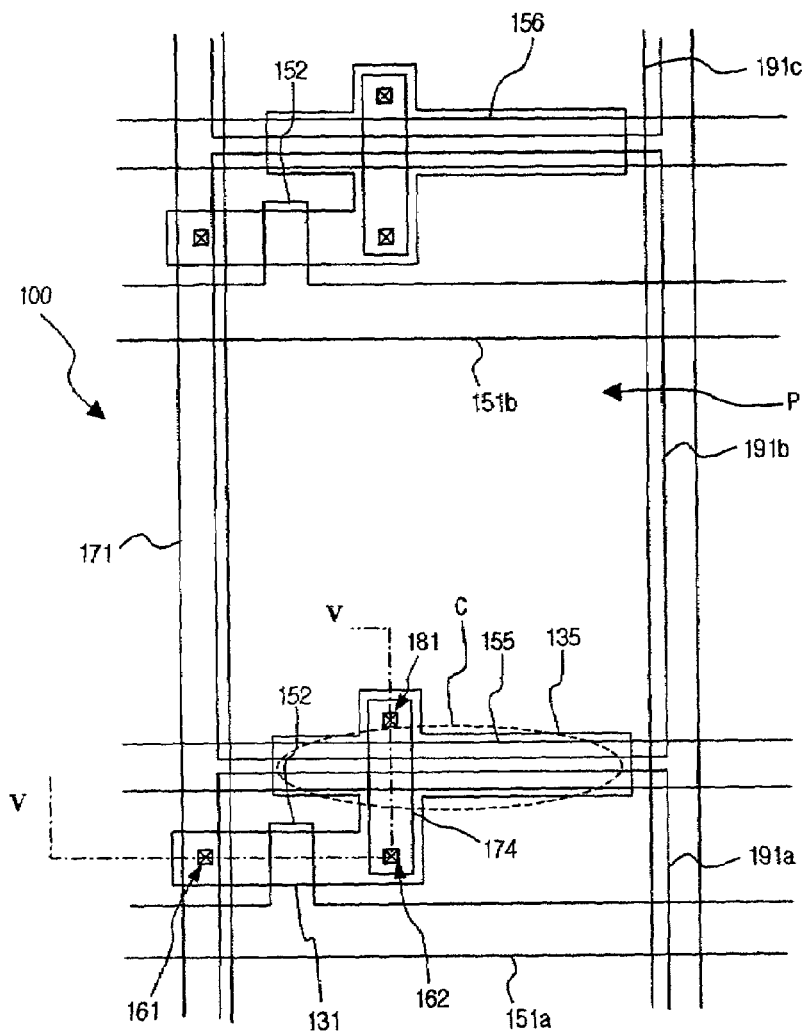
FIG. 4 is a plan view showing an exemplary array substrate of a LCD device according to the present invention.
Figure 5:
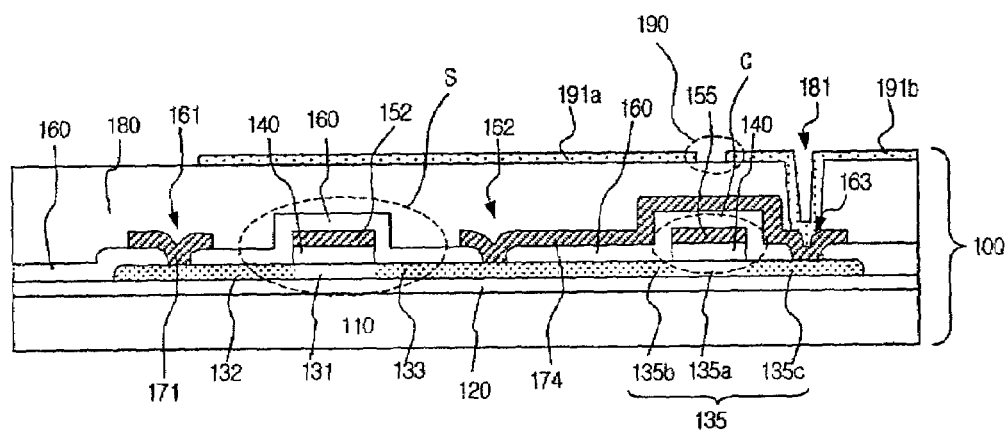
FIG. 5 is a cross-sectional view taken along line V—V of FIG. 4.

FIG. 4 is a plan view showing an exemplary array substrate 100 of a LCD device according to the present invention, and FIG. 5 is a cross-sectional view taken along line V—V of FIG. 4.

In FIGS. 4 and 5, a buffer layer 120 made of silicon oxide, for example, may be formed on a substrate 110. A TFT active layer 131, a source region 132, a drain region 133, and a storage portion 135 formed of polysilicon, may be formed on the buffer layer 120. The storage portion 135 may include a capacitor active layer 135a, a first side portion 135b, and a second side portion 135c. The source region 132, the drain region 133, and the first and second side portions 135b and 135c of the storage portion 135 may be made of doped polysilicon layers.

A gate insulating layer 140 may be formed to cover the TFT active layer 131 and the capacitor active layer 135a, and a gate electrode 152 and a capacitor electrode 155 may be formed over the TFT active layer 131 and the capacitor active layer 135a, respectively. The gate electrode 152, the TFT active layer 131, and the source and drain regions 132 and 133 may comprise a switching device "S," with the storage portion 135 and the capacitor electrode 155 comprising a storage capacitor "C." The gate electrode 152 may be orthogonal to and integrally connected with a gate line 151a. An interlayer-insulating layer 160 may be formed of silicon oxide or silicon nitride, for example, to cover the gate electrode 152 and the capacitor electrode 155. The interlayer-insulating layer 160 may include a first contact hole 161, a second contact hole 162, and a third contact hole 163 that expose contact portions of the source region 132, the drain region 133, and the second side portion 135c of the storage portion 135, respectively.

A data line 171 and a connecting electrode 174 may be formed of a conductive material such as metal, for example, formed on the interlayer insulating layer 160. The data line 171 perpendicularly crosses gate lines 151a and 151b. Moreover, the data line 171 may be electrically connected with a contact portion of the source region 132 via the first contact hole 161. The connecting electrode 174 may be electrically connected with a contact portion of the drain region 133 and the second side portion 135c of the storage portion 135, respectively, via the second and third contact holes 162 and 163.

A passivation layer 180 may be formed to cover a surface of the substrate 110 where the above-described layers are formed. A fourth contact hole 181 may be formed passing through the passivation layer 180, thereby exposing a contact portion of the connecting electrode 174 that is disposed over the second side portion 135c of the storage portion 135. First to third pixel electrodes 191a to 191c may be formed on the passivation layer 180.

The first and second pixel electrodes 191a and 191b may be separated by an interval 190 disposed over the capacitor electrode 155. The second pixel electrode 191b electrically contacts a contact portion of the connecting electrode 174 via the fourth contact hole 181 such that the second pixel electrode 191b receives signals from the gate line 151a to serve as a "present" pixel electrode. The first pixel electrode 191a receives signals from another gate line (not shown) to serve as a "next" pixel electrode, and the third pixel electrode 191c receives signals from the gate line 151b to serve as a "previous" pixel electrode. Accordingly, in the present exemplary array substrate, a pixel region "P" is surrounded by the capacitor electrode 155, a "previous" capacitor electrode 156, and the data line 171.

The second pixel electrode 191b, serving as the "present" pixel electrode, may overlap edge portions of the capacitor electrode 155, the capacitor electrode 156, and the data line 171. Moreover, since the second pixel electrode 191b may overlap the gate line 151b, there exists no interval between the gate line 151b and the pixel electrode 191b, thereby achieving a higher aperture ratio. Furthermore, though some parasitic capacitive coupling may be induced between the second pixel electrode 191b and the gate line 151b, since the second pixel electrode 191b receives signals from the gate line 151a and not the gate line 151b, the parasitic capacitive coupling has little effect on display quality. On the contrary, the parasitic capacitive coupling induced between the second pixel electrode 191b and the capacitor electrode 156 may provide additional storage capacitance, thereby providing the same effect as increasing the capacitance of the storage capacitor "C."

FIGS. 6A to 6D show an exemplary fabrication method for the array substrate 100 shown in FIG. 5 according to the present invention.

Figure 6A:
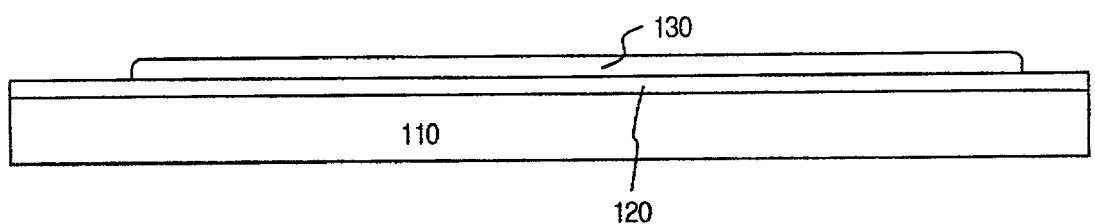
FIGS. 6A to 6D are cross-sectional views showing an exemplary sequence of fabricating an array substrate of FIG. 4.

In FIG. 6A, the buffer layer 120 may be formed of silicon oxide, for example, on the substrate 110, and then, a polysilicon layer 130 may be formed thereon and subsequently patterned. To form the polysilicon layer 130, an amorphous silicon layer may be deposited and recrystallized on the buffer layer 120. Since, the buffer layer 120 separates the polysilicon layer 130 from directly contacting the substrate 110, degradation of the polysilicon layer 130 may be avoided during recrystallization.

Figure 6B:
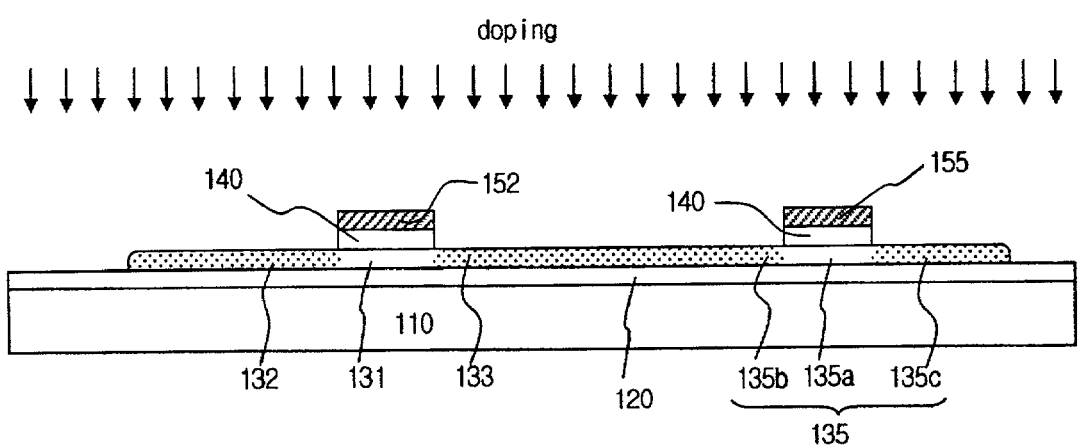

In FIG. 6B, an insulating layer made of silicon oxide or silicon nitride, for example, and a metal layer are sequentially deposited and subsequently patterned to form the gate electrode 152, the capacitor electrode 155, and the gate insulating layer 140 on the polysilicon layer 130. Then, ion doping may be applied to the polysilicon layer 130 such that portions of the polysilicon layer 130, except for portions under the gate electrode 152 and the capacitor electrode 155, are doped. After ion doping, the polysilicon layer 130 may be divided into extrinsic regions 132, 133, 135b, and 135c and intrinsic regions 131 and 135a. The extrinsic regions 132 and 133 may serve as the source region and the drain region, respectively, and the intrinsic region 131 may serve as the TFT active layer. Further, the other extrinsic regions 135b, 135c and the other intrinsic region 135a may comprise the storage portion 135.

Figure 6C:
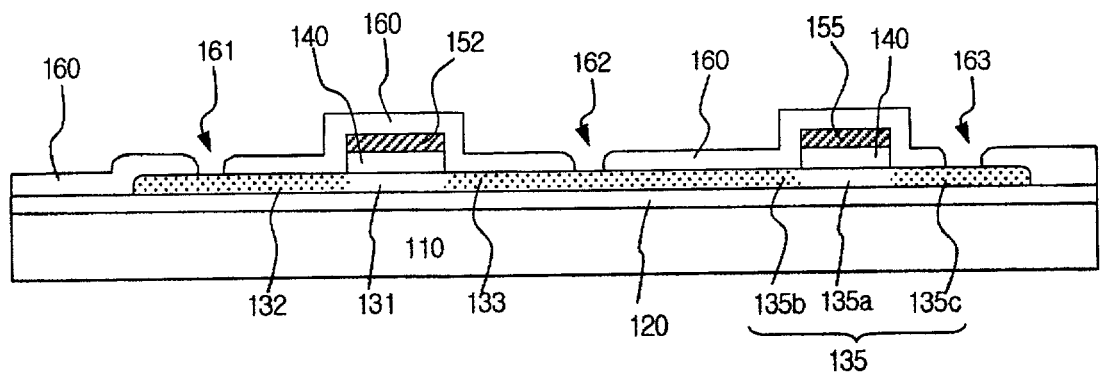

In FIG. 6C, silicon oxide or silicon nitride may be deposited to cover a surface of the substrate 110 and subsequently patterned to form the interlayer insulating layer 160 and the first to third contact holes 161 and 163. The first to third contact holes 161 and 163 expose contact portions of the source region 132, the drain region 133, and the second side portion 135c of the storage portion 135, respectively.

Figure 6D:
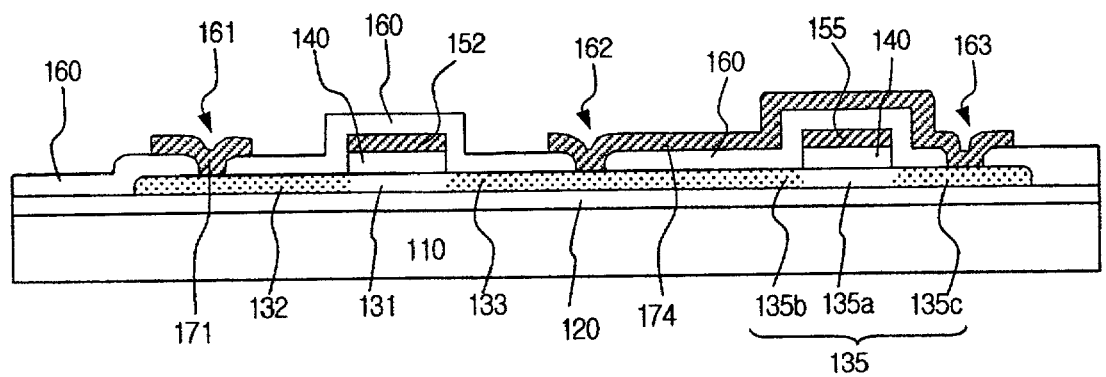

In FIG. 6D, a metal material may be deposited and patterned to form the data line 171 and the connecting electrode 174. The data line 171 may perpendicularly cross the gate lines 151a and 151b (in FIG. 4) and contact a portion of the source region 132 via the first contact hole 161. The connecting electrode 174 may contact a portion of the drain region 133 and the second side portion 135c of the storage portion 135, respectively, via the second and third contact holes 162 and 163.

Returning to FIG. 5, the passivation layer 180 may be formed to cover a surface of the substrate 110 where the data line 171 and the connecting electrode 174 are formed. Then, the passivation layer 180 may be patterned, thereby forming the fourth contact hole 181 to expose the portion of the connecting electrode 174 disposed over the third contact hole 163. Next, a transparent conductive material may be deposited on the passivation layer 180 and subsequently patterned to form the first and second pixel electrode 191a and 191b. The first and second pixel electrodes 191a and 191b may be separated from each other by the interval 190 interposed therebetween and disposed over the capacitor electrode 155. The second pixel electrode 191b may contact the connecting electrode 174 via the fourth contact hole 181. In addition, the second pixel electrode 191b may overlap edge portions of the data line 171 and the capacitor electrode 155 and at least a portion of the gate line 151b. The first pixel electrode 191a may overlap another edge portion of the capacitor electrode 155 and at least a portion of the gate line 151a that applies signals to the second pixel electrode 191b.

In the above-described exemplary array substrate of the present invention, instead of forming a source electrode and a drain electrode, the source and drain regions 132 and 133 may be disposed around the TFT active layer 131 and contact the data line 171 and the connecting electrode 174, respectively. Alternatively, the source and drain electrodes may be additionally formed connecting with the data line 171 and the connecting electrode 174, respectively, and may contact the source and drain regions 132 and 133, respectively.

As described above, the first and second pixel electrodes 191a and 191b may be separated from each other by the interposed interval 190 disposed over the capacitor electrode 155. Since the second pixel electrode 191b overlaps the gate line 151b and not the gate line 151a, any parasitic capacitive coupling decreases and the capacitance of the storage capacitor "C" and the aperture ratio increase.

In the above-described exemplary array substrate of the present invention, the connecting electrode 174 may be made of the same material as the data line 171 that contacts the drain region 133 and the second pixel electrode 191b for transmitting signals between the drain region 133 and the second pixel electrode 191b. However, a doped polysilicon layer may be used to transmit signals from the drain region 133 to the second pixel electrode 191b, thereby achieving a higher aperture ratio.

Figure 7:
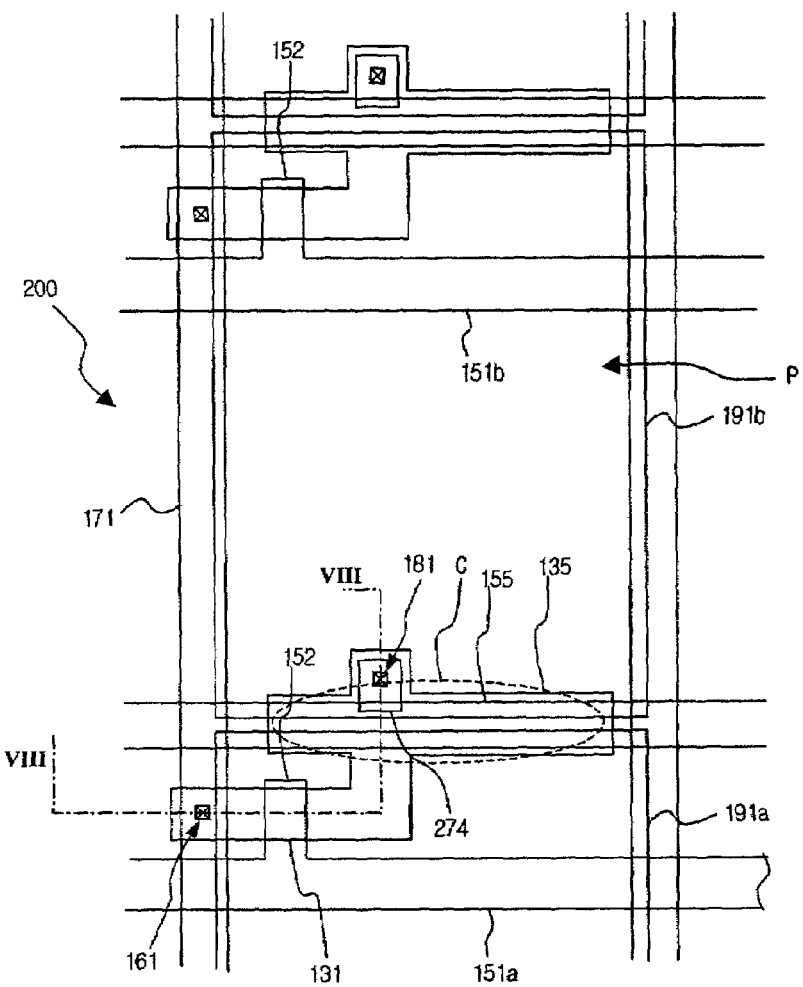
FIG. 7 is a plan view showing another exemplary array substrate of a LCD device according to the present invention.
Figure 8:
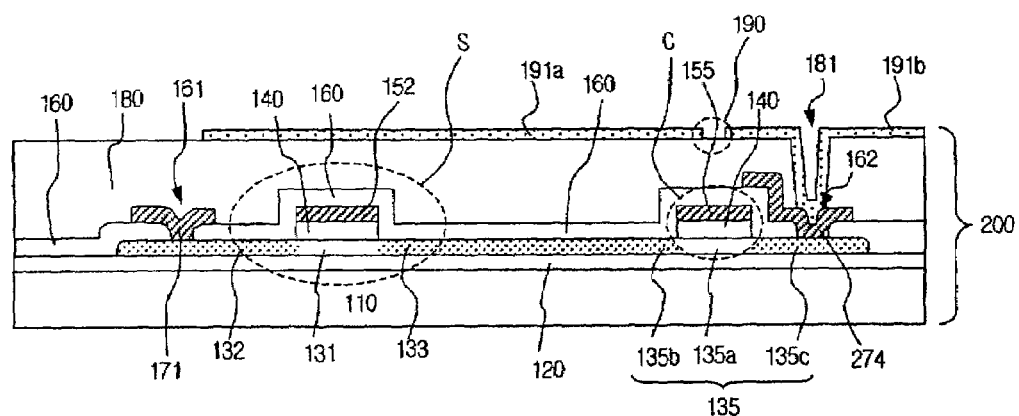
FIG. 8 is a cross-sectional view taken along line VIII—VIII of FIG. 7.

FIG. 7 is a plan view showing another exemplary array substrate 200 of a LCD device according to the present invention, and FIG. 8 is a cross-sectional view taken along line VIII—VIII of FIG. 7.

In FIGS. 7 and 8, a buffer layer 120 made of silicon oxide, for example, may be formed on a substrate 110. A TFT active layer 131, a source region 132, a drain region 133, and a storage portion 135 formed of polysilicon, may be formed on the buffer layer 120. The storage portion 135 may include a capacitor active layer 135a, a first side portion 135b, and a second side portion 135c. The source region 132, the drain region 133, and the first and second side portions 135b and 135c of the storage portion 135 may be doped with impurities.

A gate insulating layer 140 may be formed to cover the TFT active layer 131 and the capacitor active layer 135a, and a gate electrode 152 and a capacitor electrode 155 may be formed over the TFT active layer 131 and the capacitor active layer 135a, respectively. The gate electrode 152 may be orthogonal to and integrally connected with a gate line 151a. The storage portion 135 and the capacitor electrode 155 may comprise a storage capacitor "C." An interlayer-insulating layer 160 may be formed of silicon oxide or silicon nitride, for example, to cover the gate electrode 152 and the capacitor electrode 155. The interlayer-insulating layer 160 may include a first contact hole 161 and a second contact hole 162, which expose contact portions of the source region 132 and the second side portion 135c of the storage portion 135, respectively.

A data line 171 and a connecting electrode 274 may be formed of a conductive material such as metal, for example, on the interlayer insulating layer 160. The data line 171 may perpendicularly cross gate lines 151a and 151b. Moreover, the data line 171 may be electrically connected with a contact portion of the source region 132 via the first contact hole 161. The connecting electrode 274 may be disposed over the second side portion 135c of the storage portion 135, and electrically connected with the second side portion 135c via the second contact hole 162.

A passivation layer 180 may be formed to cover a surface of the substrate 110 where the above-described layers are formed. A third contact hole 181 may be formed passing through the passivation layer 180, thereby exposing a contact portion of the connecting electrode 274. A first pixel electrode 191a and a second pixel electrode 191b may be formed on the passivation layer 180. The first and second pixel electrodes 191a and 191b may be separated from each other by an interposed interval 190 disposed over the capacitor electrode 155. The second pixel electrode 191b may overlap the gate line 151b and an edge portion of the capacitor electrode 155.

Since the interposed interval 190 is disposed over the capacitor electrode 155, the exemplary array substrate 200 may benefit from the same advantages as those of the exemplary array substrate 100 (in FIG. 4). Moreover, since the doped side portions of the polysilicon layer are used to transmit signals from the drain region 133 to the second pixel electrode 191b, the exemplary array substrate 200 provides a higher aperture ratio. However, if doped polysilicon is used to transmit signals, more response delay may occur.

Figure 9:
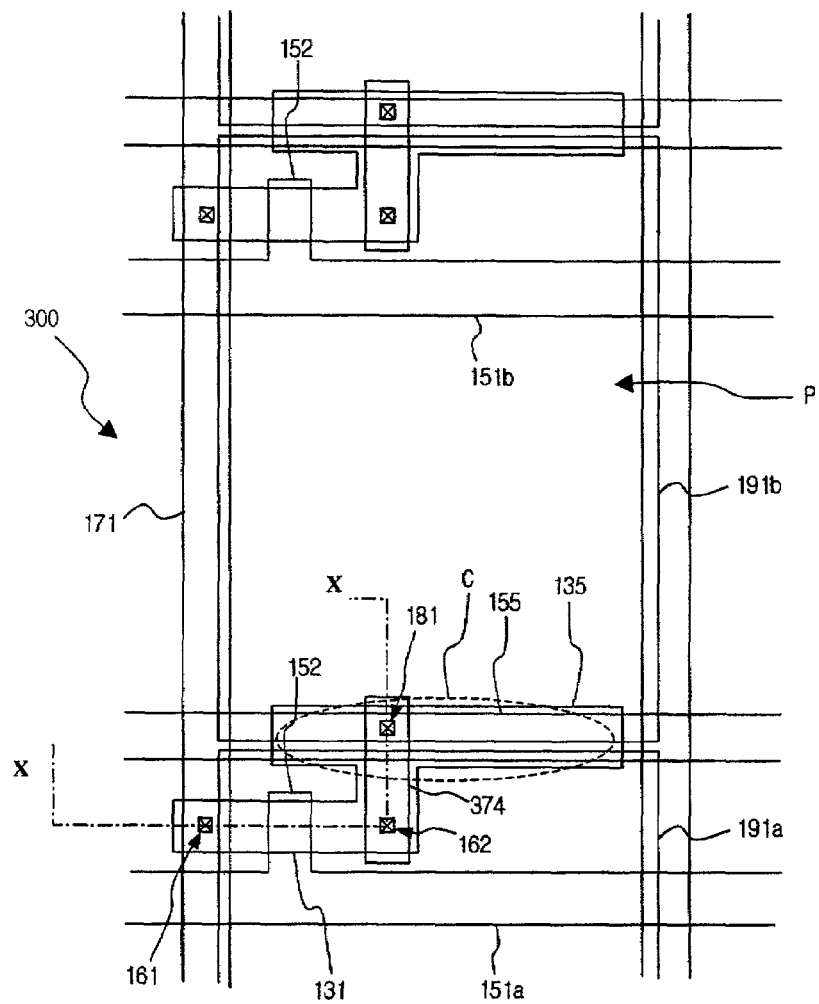
FIG. 9 is a plan view showing another exemplary array substrate of a LCD device according to the present invention.
Figure 10:
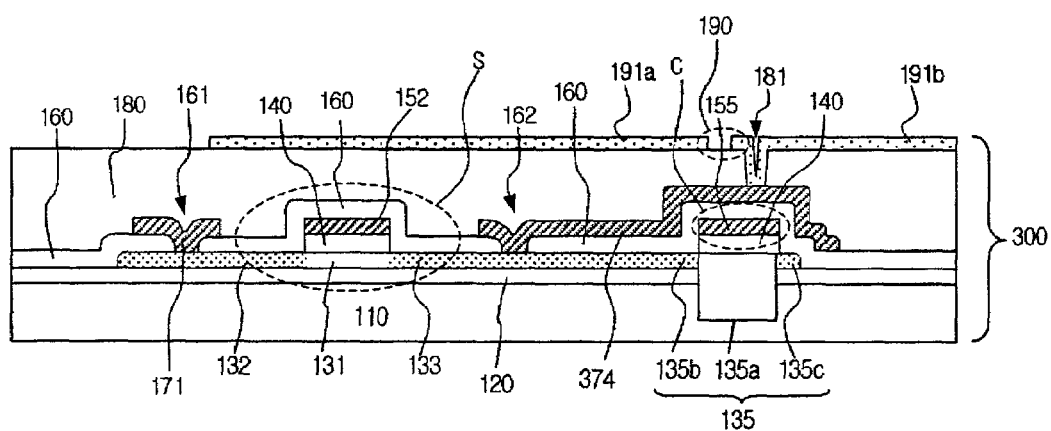
FIG. 10 is a cross-sectional view taken along line X—X of FIG. 9.

FIG. 9 is a plan view showing another exemplary array substrate 300 of a LCD device according to the present invention, and FIG. 10 is a cross-sectional view taken along line X—X of FIG. 9.

In FIG. 10, a connecting electrode 374 made of metal, for example, may be implemented to improve response quality. The connecting electrode 374 may electrically connect a drain region 133 with a second pixel electrode 191b. Moreover, the second pixel electrode 191b may contact the connecting electrode 374 that is disposed over a capacitor electrode 155, thereby improving the aperture ratio.

In FIGS. 9 and 10, a buffer layer 120 made of silicon oxide, for example, may be formed on a substrate 110. A TFT active layer 131, a source region 132, a drain region 133, and a storage portion 135 formed of polysilicon, may be formed on the buffer layer 120. The storage portion 135 may include a capacitor active layer 135a, a first side portion 135b, and a second side portion 135c. The source region 132, the drain region 133, and the first and second side portions 135b and 135c of the storage portion 135 may be doped with impurities.

A gate insulating layer 140 may be formed to cover the TFT active layer 131 and the capacitor active layer 135a, and a gate electrode 152 and a capacitor electrode 155 may be formed over the TFT active layer 131 and the capacitor active layer 135a, respectively. The gate electrode 152 may be orthogonal to and integral with a gate line 151a. The storage portion 135 and the capacitor electrode 155 may comprise a storage capacitor "C." An interlayer-insulating layer 160 may be formed of silicon oxide or silicon nitride, for example, to cover the gate electrode 152 and the capacitor electrode 155. The interlayer-insulating layer 160 may include a first contact hole 161 and a second contact hole 162, which expose contact portions of the source region 132 and the drain region 133, respectively.

A data line 171 and a connecting electrode 374 may be formed of a conductive material such as metal, for example, on the interlayer insulating layer 160. The data line 171 may perpendicularly cross gate lines 151a and 151b. Moreover, the data line 171 may be electrically connected with a contact portion of the source region 132 via the first contact hole 161, and the connecting electrode 374 may be electrically connected with contact portions of the drain region 133 via the second contact hole 162.

A passivation layer 180 may be formed to cover a surface of the substrate 110 where the above-described layers are formed. A third contact hole 181 may be formed passing through the passivation layer 180, thereby exposing a contact portion of the connecting electrode 374 disposed over the capacitor electrode 155. A first pixel electrode 191a and a second pixel electrode 191b may be formed on the passivation layer 180, and the first and second pixel electrodes 191a and 191b may be separated from each other by an interposed interval 190 disposed over the capacitor electrode 155. The second pixel electrode 191b may overlap the previous gate line 151b and an edge portion of the capacitor electrode 155.

Although the above-described examples of the present invention implement polysilicon active layers, pixel structures may be implemented with amorphous silicon active layers.

Figure 11:
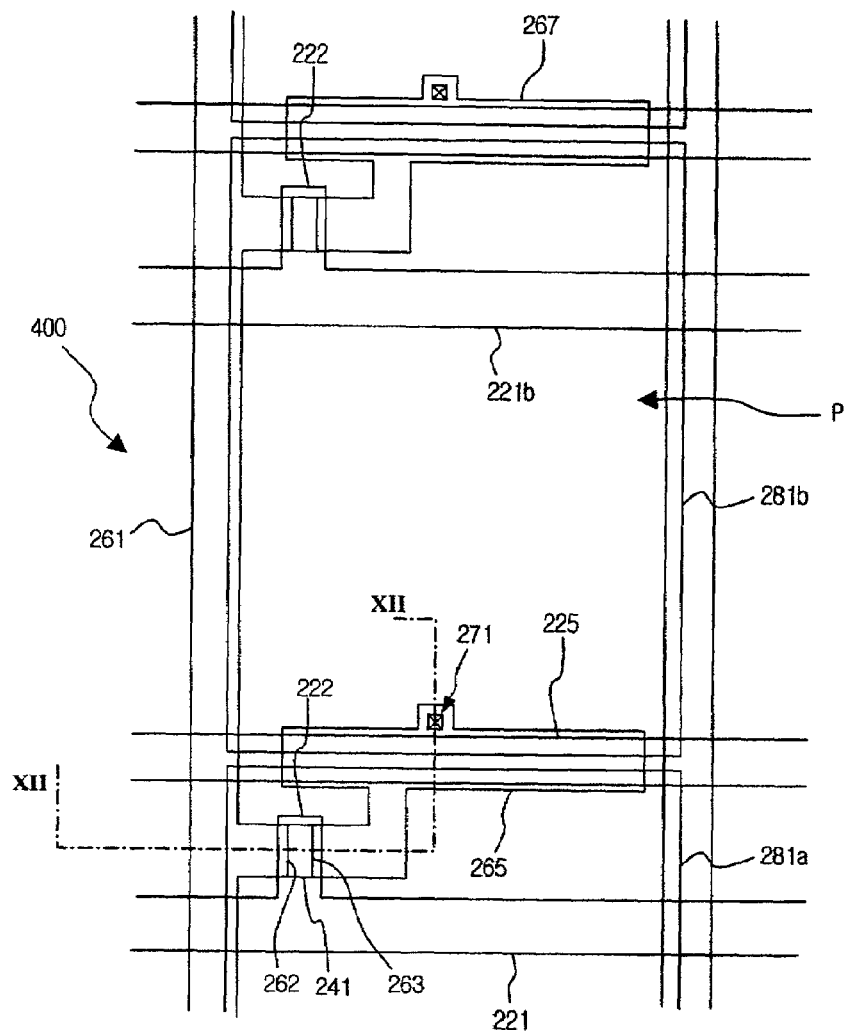
FIG. 11 is a plan view showing another exemplary array substrate of a LCD device according to the present invention.
Figure 12:
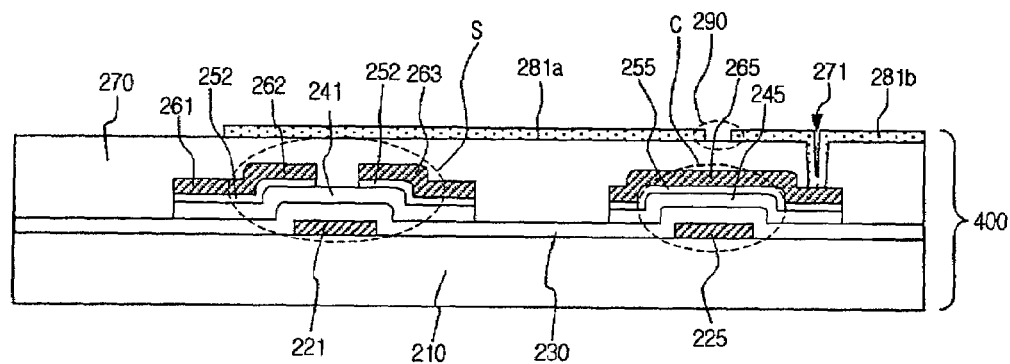
FIG. 12 is a cross-sectional view taken along line XII—XII of FIG. 11.

FIG. 11 is a plan view showing another exemplary array substrate 400 of a LCD device according to the present invention, and FIG. 12 is a cross-sectional view taken along line XII—XII of FIG. 11.

In FIGS. 11 and 12, a gate line 221, a gate electrode 222 protruding from the gate line 221, and a first capacitor electrode 225 disposed parallel to the gate line may all be formed of metal, for example, on a substrate 210. A gate insulating layer 230 made of silicon oxide or silicon nitride, for example, may be disposed covering the gate line 221, the gate electrode 222, and the first capacitor electrode 225. A first silicon layer 241 and a second silicon layer 245 may be disposed on the gate insulating layer 230. A first ohmic contact layer 252 and a second ohmic contact layer 255 may be disposed on the first and second silicon layers 241 and 245, respectively. The first and second ohmic contact layer 252 and 255 may be made of a doped amorphous silicon, for example. A data line 261, a source electrode 262, and a drain electrode 263 may be disposed on the first ohmic contact layer 252, and a second capacitor electrode 265 may be disposed on the second ohmic contact layer 255. The data line 261 may perpendicularly cross the gate line 221, and the source electrode 262 may be integrally connected with the data line 261. The drain electrode 263 may be spaced apart from the source electrode 262 with the gate electrode centered on therebetween, and may be electrically connected with the second storage electrode 265. The gate electrode 221, the source electrode 262, the drain electrode 263, the first silicon layer 241, and the first ohmic contact layer 252 may comprise a switching device "S." The first capacitor electrode 225, the second capacitor electrode 265, the second ohmic contact layer 255, and the second silicon layer 245 may comprise a storage capacitor "C." A passivation layer 270 may be disposed to cover the data line 261, the source and drain electrodes 262 and 263, and the second capacitor electrode 265. A contact portion of the second capacitor electrode 265 may be exposed through the passivation layer 270 via a contact hole 271.

A first pixel electrode 281a and a second pixel electrode 281b may be disposed on the passivation layer 270, and an interval 290 between the first and second pixel electrodes 281a and 281b may be disposed over the second capacitor electrode 265. The first and second pixel electrodes 281a and 281b may be separated from each other by the interval 290 interposed therebetween, and the interval may be disposed over the second capacitor electrode 265. The second pixel electrode 281b may overlap a gate line 221b and an edge portion of the second capacitor electrode 265. Furthermore, the second pixel electrode 281b may contact the second capacitor electrode 265 via the contact hole 271.

It will be apparent to those skilled in the art that various modifications and variation can be made in the method of manufacturing a thin film transistor of the present invention without departing from the spirit or scope of the invention. Thus, it is intended that the present invention cover the modifications and variations of this invention provided they come within the scope of the appended claims and their equivalents.

What is claimed is:

1. An array substrate of a liquid crystal display device, comprising:
    a substrate;
    a plurality of gate lines disposed on the substrate;
    a plurality of data lines disposed perpendicular to the gate lines;
    a plurality of storage capacitors each having at least a first electrode disposed parallel to a corresponding gate line and a second electrode extending into the substrate;
    a plurality of switching devices each including an active layer having a channel region and each electrically connected with the corresponding gate line and the corresponding data line; and
    a plurality of pixel electrodes each overlapping at least said channel region, a portion of an $n^{th}$ storage capacitor and a portion of a $(n-1)^{th}$ storage capacitor,
    wherein an $n^{th}$ one of the pixel electrodes completely covers an $(n-1)^{th}$ adjacent gate line and the channel region of an $(n-1)^{th}$ adjacent one of the switching devices connected to the $(n-1)^{th}$ adjacent gate line, and the $n^{th}$ one of the pixel electrodes is unconnected to the $(n-1)^{th}$ adjacent one of the switching devices.

2. The array substrate according to claim 1, wherein the active layer is formed of polysilicon.

3. The array substrate according to claim 2, wherein each of the at least first electrodes of the plurality of storage capacitors are made of a same material as the gate line.

4. The array substrate according to claim 3, wherein the second electrode of each of the plurality of storage capacitors is made of a same material as the active layer.

5. The array substrate according to claim 1, wherein each of the plurality of switching devices includes an active layer made of amorphous silicon.

6. The arrays substrate according to claim 5, wherein the first electrode of the plurality of storage capacitors is made of a same material as the corresponding gate line.

7. The array substrate according to claim 6, wherein a second electrode of each of the plurality of storage capacitors is made of a same material as a corresponding data line.

8. A method of fabricating an array substrate for a liquid crystal display device, comprising the steps of:
    forming a first insulating layer on a substrate;
    forming a polysilicon layer on the first insulating layer;
    sequentially forming a second insulating layer and a first metal layer on the polysilicon layer;
    patterning both the second insulating layer and the first metal layer to form a gate line, a gate electrode, and a capacitor electrode, the patterned second insulating layer being underneath the patterned metal layer;
    doping portions of the polysilicon layer;
    forming a third insulating layer to cover the first metal layer and the doped portions of the polysilicon layer, the third insulating layer including contact holes exposing the doped portions of the polysilicon layer;
    forming a second metal layer on the third insulating layer, the second metal layer including at least a data line and a connecting electrode each electrically contacting the doped portions of the polysilicon layer via the contact holes;
    forming a fourth insulating layer to cover the second metal layer, wherein a portion of the connecting electrode is through the fourth insulating layer; and
    forming a pixel electrode on the fourth insulating layer, the pixel electrode electrically contacting the connecting electrode, an end portion of the pixel electrode overlapping a portion of the capacitor electrode;
    wherein the connecting electrode contacts the doped portions of the polysilicon layer at opposite sides of the capacitor electrodes, and the pixel electrode is separate from an adjacent pixel electrode by a gap disposed above the capacitor electrode, and the pixel electrode completely covers an adjacent gate line and a channel region of an adjacent switching device connected to the adjacent gate line such that the pixel electrode is unconnected to the adjacent switching device.

9. The method according to claim 8, wherein the pixel electrode contacts the connecting electrode over the capacitor electrode.

10. An array substrate of a liquid crystal display device, comprising:
    a substrate;
    a plurality of gate lines disposed on the substrate;
    a plurality of data lines disposed perpendicular to the gate lines;
    a plurality of storage capacitors each having at least a first electrode disposed parallel to a corresponding gate line and a second electrode disposed parallel to a corresponding data line;
    a plurality of switching devices each including an active layer having a channel region and each electrically connected with the corresponding gate line and a corresponding data line; and
    a plurality of pixel electrodes each overlapping at least said channel region and each directly contacting the second electrode of one of the plurality of storage capacitors,
    wherein the second electrode includes first and second portions each disposed at opposing surfaces of the first electrode parallel to the substrate, and
    wherein an $n^{th}$ one of the pixel electrodes completely covers an $(n-1)^{th}$ adjacent gate line and the channel region of an $(n-1)^{th}$ adjacent one of the switching devices connected to the $(n-1)^{th}$ adjacent gate line, and the $n^{th}$ one of the pixel electrodes is unconnected to the $(n-1)^{th}$ adjacent one of the switching devices.

11. The array substrate according to claim 10, wherein the active layer is formed of polysilicon.

12. The array substrate according to claim 10, wherein each of the at least first electrodes of the plurality of storage capacitors are made of a same material as the gate line.

13. The array substrate according to claim 10, wherein a second electrode of each of the plurality of storage capacitors is made of a same material as the active layer.

14. The array substrate according to claim 10, wherein each of the plurality of switching devices includes an active layer made of amorphous silicon.

15. The arrays substrate according to claim 10, wherein the first electrode of the plurality of storage capacitors is made of a same material as the corresponding gate line.

16. The array substrate according to claim 10, wherein a second electrode of each of the plurality of storage capacitors is made of a same material as a corresponding data line.

17. The array substrate according to claim 10, wherein the first and second portions of the second electrode are electrically interconnected at a plurality of locations.

18. The array substrate according to claim 17, wherein one of the first and second portions of the second electrode is disposed parallel to the substrate.

19. The array substrate according to claim 10, further comprising a connecting electrode overlapping at least one of the first and second electrodes of the plurality of storage capacitors.

* * * * *